United States Patent
Kagawa et al.

[11] Patent Number: 5,931,250
[45] Date of Patent: Aug. 3, 1999

[54] AUTOMATIC STEERING APPARATUS

[75] Inventors: Kazunori Kagawa, Odawara; Hiroaki Tanaka, Toyota, both of Japan

[73] Assignee: Toyota Jidosha Kabushiki Kaisha, Japan

[21] Appl. No.: 08/746,172

[22] Filed: Nov. 7, 1996

[30] Foreign Application Priority Data

Feb. 5, 1996 [JP] Japan .................................. 8-019172

[51] Int. Cl.⁶ .................................................. B62D 1/04
[52] U.S. Cl. ............................ 180/167; 180/443; 74/552
[58] Field of Search ........................... 180/167, 401, 180/407, 443, 444, 446; 74/552; 192/55.1, 56.6, 56.61, 56.62

[56] References Cited

U.S. PATENT DOCUMENTS

| | | | |
|---|---|---|---|
| 716,183 | 12/1902 | Brazier | 74/552 |
| 2,209,155 | 7/1940 | Fagg | 192/56.62 |
| 2,331,144 | 10/1943 | Sitter | 180/446 |
| 2,966,977 | 1/1961 | Johnson | 192/55.1 |
| 2,981,355 | 4/1961 | Rabuse | 180/401 |
| 3,002,206 | 10/1961 | Johnson | 192/56.62 |
| 3,422,784 | 1/1969 | Becker | 74/552 |
| 3,877,253 | 4/1975 | Yeagle | 192/55.1 |
| 4,219,093 | 8/1980 | Lang | 180/401 |
| 4,573,545 | 3/1986 | Kalns | 180/446 |
| 4,901,544 | 2/1990 | Jang | 74/552 |
| 5,234,070 | 8/1993 | Noah et al. | 180/169 |
| 5,289,893 | 3/1994 | Yamamoto et al. | 180/427 |
| 5,375,863 | 12/1994 | Chapman | 280/99 |
| 5,386,897 | 2/1995 | Yang | 192/55.1 |

FOREIGN PATENT DOCUMENTS

| | | | |
|---|---|---|---|
| 52-13216 | 2/1977 | Japan | 180/401 |
| 03-286315 | 12/1991 | Japan . | |
| 05-050932 | 3/1993 | Japan . | |

*Primary Examiner*—J J Swann
*Assistant Examiner*—Frank Vanaman
*Attorney, Agent, or Firm*—Finnegan, Henderson, Farabow, Garrett, & Dunner, L.L.P.

[57] ABSTRACT

For automatic steering control by simultaneously turning a steering shaft and a steering wheel, an apparatus prevents automatic turning torque from being transmitted to the steering wheel when a driver operates the steering wheel and allows the steering wheel to turn freely. A V-shaped recess is formed on the side of the steering wheel, and a ball is provided on the side of the steering shaft. The ball is pushed by a spring toward the steering wheel and positioned within the V-shaped recess during automatic steering to connect the steering wheel with the steering shaft, thereby transmitting the turning torque. When torque which is equal to or exceeding a prescribed value is applied to the steering wheel, the ball is separated from the V-shaped recess to interrupt the transmission of the turning torque, and the steering wheel can be turned freely.

7 Claims, 4 Drawing Sheets

AUTOMATIC STEERING APPARATUS

BACKGROUND OF THE INVENTION

1. Field of the Invention

The invention relates to an automatic steering apparatus, and more particularly to steering control when disturbance torque is applied during automatic steering.

2. Description of the Related Art

Automatic steering apparatuses have been proposed to run a vehicle along a desired running line. For example, Japanese Patent Laid-Open Publication No. Hei 5-50932 discloses a mechanism which calculates a steering pattern for avoiding a collision and turns a steering shaft to run a vehicle according to the steering pattern. And, if a driver steers a steering wheel to exceed a prescribed angle during the automatic steering, steering by the driver is restricted by an electric motor to secure running according to the steering pattern.

Restriction of the driver's steering operation by the electric motor is not, however, preferable because a system becomes complicated and the driver suffers from an undesired load. Also, when the vehicle is turning by the automatic steering, the driver might hold the steering wheel to hold his or her position. In such cases, automatic turning of the steering wheel is not preferable.

SUMMARY OF THE INVENTION

In view of the above disadvantages involved in the related art, this invention has been achieved and aims to provide a user-friendly automatic steering apparatus which continuously guides a vehicle by automatic steering and does not apply an extra load to a driver even when the driver intentionally or unintentionally turns the steering wheel during automatic steering.

To achieve the above object, the automatic steering apparatus according to this invention comprises turning means for automatically turning a steering shaft, and torque control means for interrupting the transmission of automatic turning torque to a steering wheel when torque equal to or exceeding a prescribed value other than the automatic turning torque is applied to the steering wheel during automatic turning. One aspect of the torque control means comprises a ball which is provided on one side of the steering shaft and the steering wheel, an elastic member for pushing the ball toward the other side, and a recess which is provided on the other side to fit to the ball; the ball is fitted into the recess to transmit the automatic turning torque from the steering shaft to the steering wheel, and the ball is separated from the recess when torque equal to or exceeding a prescribed value other than the automatic turning torque is applied to the steering wheel.

The automatic steering apparatus according to this invention further comprises a first disk provided at the leading end of the steering shaft, and a second disk provided on the back of the steering wheel to oppose the first disk; the first disk is provided with projections and the second disk is provided with grooves to oppose the projections. The projections and the grooves are mutually engaged for manual steering to integrally turn the first disk and the second disk, and the projections are separated from the grooves for automatic steering.

Another aspect of the automatic steering apparatus according to this invention further comprises electromagnetic drive means which are connected to the ball to push it against said recess; the electromagnetic drive means do not operate during automatic steering and the ball is pushed by the elastic member. The electromagnetic drive means operate during the manual driving and the ball is pushed against the recess by the electromagnetic drive means.

Further, the automatic steering apparatus according to this invention comprises an automatic steering mechanism for turning the steering shaft, a clutch which connects the steering shaft with the steering wheel during manual turning and releases the steering shaft from the steering wheel during automatic steering, and a sub-clutch which connects the steering shaft with the steering wheel by a given elastic force during the automatic steering. One aspect of the sub-clutch comprises a spring which is provided on the side of the steering shaft, a ball which is connected to the spring and pushed toward the steering wheel, and a recess which is provided on the side of the steering wheel and receives the ball.

DETAILED DESCRIPTION OF THE PREFERRED EMBODIMENTS

Embodiments of the invention will be described with reference to the accompanying drawings.

First embodiment:

The automatic turning mechanism of this embodiment is the same as a conventional unit and has a gear at the bottom end of a steering shaft which is turned by an electric motor to automatically turn the steering shaft. On the other hand, the steering wheel and the steering shaft are, unlike the conventional units, not mutually fixed and are structured so as to connect or separate as required.

Figure 1A:
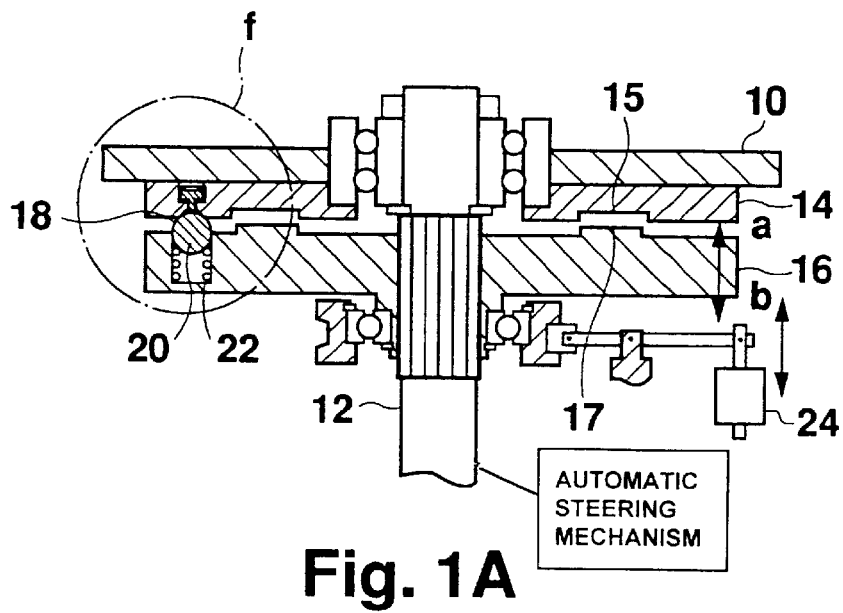
FIG. 1A is a sectional view of a first embodiment of the invention.
Figure 1B:
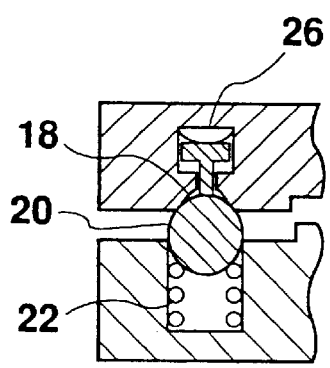
FIG. 1B is a partially expanded sectional view of FIG. 1A.

FIGS. 1A and 1B show a connected state of the steering shaft and the steering wheel. FIG. 1A shows a general structure in which a steering wheel 10 and a steering shaft 12 have disks 14 and 16 respectively, the disk 14 on the side of the steering wheel 10 has grooves 15, and the disk 16 on the side of the steering shaft 12 has projections 17. The grooves 15 and the projections 17 form a clutch. When a vehicle runs in manual drive, an actuator 24 moves the disk 16 in the direction of a to engage the projections 17 of the disk 16 with the grooves 15 of the disk 14, so that the steering wheel 10 and the steering shaft 12 are coupled. Thus, in the manual drive, steering operation by the driver is directly transmitted to the steering shaft 12 to control the vehicle as the driver desires.

Figure 2:
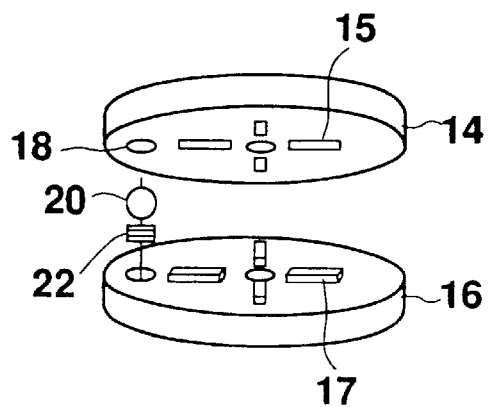
FIG. 2 is a layout explanatory diagram of the disks, ball and spring shown in FIG. 1A.

FIG. 2 shows a layout of the grooves 15 and the projections 17 in a schematic form. The grooves 15 are provided in the quantity of four each at an angle of 90 degrees with respect to the center of the disk 14, and the projections 17 are provided on the disk 16 in the quantity of four to oppose the four grooves 15. The grooves 15 and the projections 17 are mutually engaged to operate as a clutch. The number of the grooves 15 and the projections 17 may be less than four and can be formed in the number of more than four if necessary. Also, a V-shaped recess 18 is formed at the edge of the disk 14, and a ball 20 and a spring 22 for pushing the ball 20 toward the V-shaped recess 18 are provided on the disk 16 to oppose the V-shaped recess 18. The V-shaped recess 18, the ball 20 and the spring 22 function as a sub-clutch, and their engaged state will be described afterward.

When the vehicle runs by automatic steering, the actuator 24 moves the disk 16 in the direction of b to separate the projections 17 from the grooves 15 as shown in FIG. 1A. The steering wheel 10 and the steering shaft 12 are mutually connected by the sub-clutch or torque control means denoted by f in FIG. 1A.

FIG. 1B shows an expanded view of the torque control means. As described above, the V-shaped recess 18 is formed on the side of the steering wheel 10, and the ball 20 which is pushed by the spring 22 toward the steering wheel 10 is provided on the side of the steering shaft 12. When the ball 20 is positioned in the V-shaped recess 18, a force to hold the ball 20 in the V-shaped recess 18 is applied by the spring 22, so that the steering wheel 10 and the steering shaft 12 are connected by means of the ball 20, and the steering wheel 10 is turned together with the steering shaft 12 by turning torque of the steering shaft 12. A connection force depends on an elastic force of the spring 22 and can be varied by varying the elastic force.

Thus, in the automatic steering mode, the turning torque of the steering shaft 12 is transmitted to the steering wheel 10 by the engagement of the V-shaped recess 18 and the ball 20. And, the driver can easily know that the automatic steering is in progress because the steering wheel 10 is automatically turned. And, even when small disturbance torque is applied to the steering wheel 10, the steering wheel 10 can be turned continuously because the ball 20 is kept positioned in the V-shaped recess 18 by virtue of the pushing force of the spring 22.

If the driver intentionally or unintentionally operates the steering wheel 10 during automatic steering mode and torque equal to or exceeding a prescribed value is applied to the steering wheel 10, the ball 20 is separated from the V-shaped recess 18, despite the pushing force of the spring 22. Then, the ball 20 rolls on the flat face of the disk 14 so the automatic turning torque of the steering shaft 12 is not transmitted to the steering wheel 10, and the steering wheel 10 can be turned freely. In such a situation, the automatic steering is still continued because the steering shaft 12 itself is turned as desired by the turning mechanism.

Figure 3:
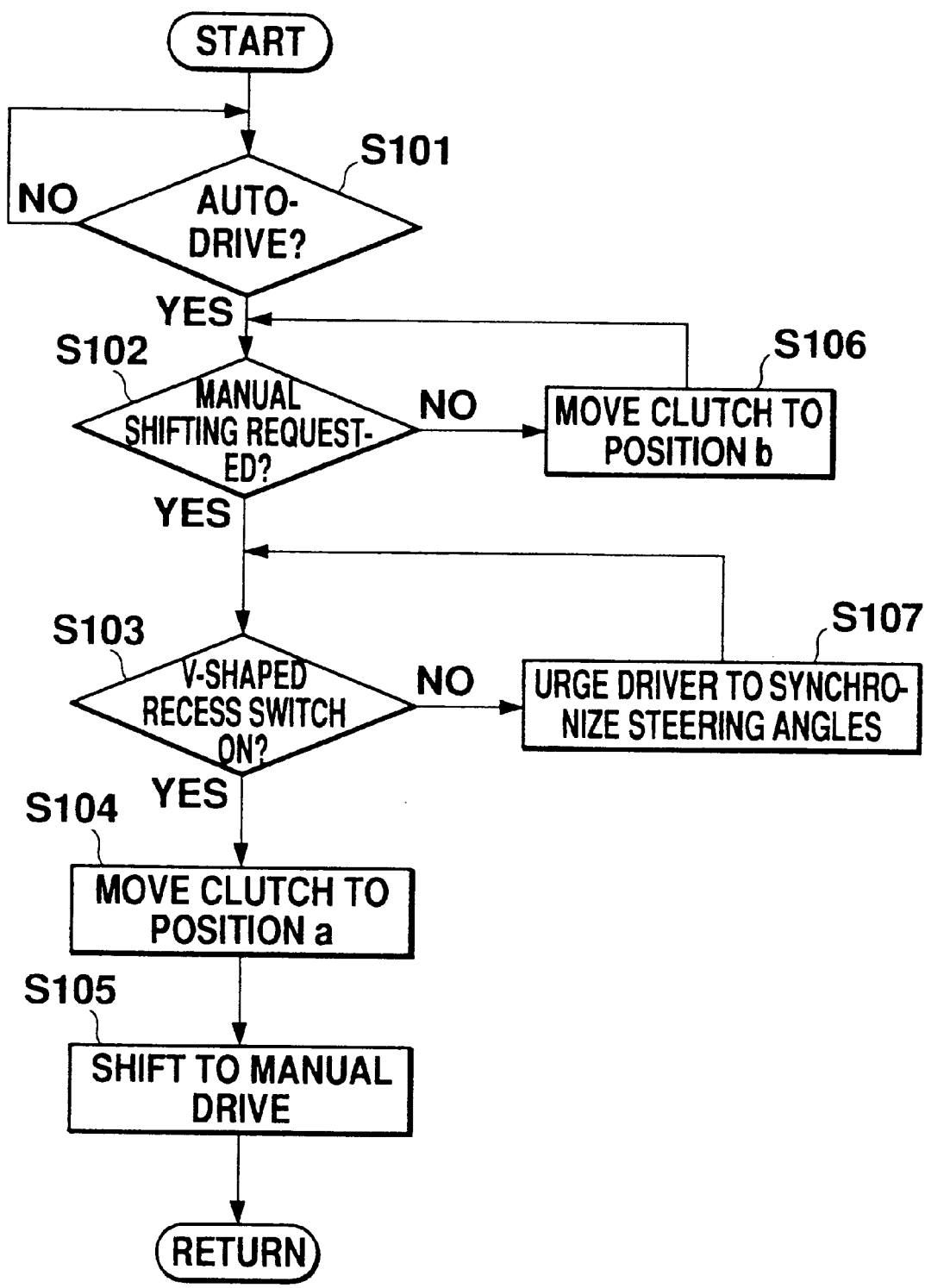
FIG. 3 is a flowchart showing an operation of the first embodiment.

FIG. 3 shows a flowchart of the operation in this embodiment. First, it is judged whether or not the vehicle is in auto-drive (the automatic steering mode) (S101). When it is judged that the vehicle is in auto-drive, it is judged whether or not the driver has input a demand for shifting to manual drive (S102). This judgment is made by checking the operation of a manual/auto changeover switch provided near the driver's seat. When the driver does not operate a manual shifting switch and desires to continue the automatic steering, the actuator 24 moves the disk 16 (or the clutch) to the position b to separate the projections 17 of the disk 16 from the grooves 15 of the disk 14 and connects the steering wheel 10 and the steering shaft 12 by the ball 20 (S106). It has been described above that if torque equal to or exceeding the prescribed value is applied in this state, the ball 20 is separated from the V-shaped recess 18 and the turning torque of the steering shaft 12 is not transmitted to the steering wheel 10.

When the driver demands a shift from auto-drive to manual drive, it is judged whether or not a switch within the V-shaped recess 18 is turned ON (S103). The V-shaped recess switch is denoted by reference numeral 26 in FIG. 1B. When the ball 20 is positioned in the V-shaped recess 18, the V-shaped recess switch 26 is pushed upward in FIG. 1B, closing a contact and turning the switch ON. Thus, when the V-shaped recess switch 26 is OFF, the ball 20 is not positioned within the V-shaped recess 18, so that the driver is instructed by a displayed message or voice message to turn the steering wheel 10 to enter the ball 20 into the V-shaped recess 18 (S107). This instruction is given to match the turning position of the steering wheel 10 with that of the steering shaft 12. If they do not match, when the automatic steering is shifted to the manual operation, a steering amount of the vehicle does not agree with a steering operating amount, and the manual drive cannot be made smoothly (this is called steering angle synchronization). When the driver turns the steering wheel 10 according to an instruction to align the V-shaped recess 18 and the ball 20 and the ball 20 enters the V-shaped recess 18, the V-shaped recess switch 26 is turned ON. And, when it is detected that the switch 26 has been turned ON, the actuator 24 moves the disk 16 to the position a to engage the grooves 15 with the projections 17 (S104). Thus, the steering wheel 10 and the steering shaft 12 are connected to shift to manual drive, and the driver can control the vehicle by operating the steering wheel 10 (S105).

In the above embodiment, if the ball 20 is not in the V-shaped recess 18 when the shift to the manual drive is demanded, the driver is instructed to operate the steering wheel 10 to synchronize the steering angles, though this process can be automated.

Figure 4:
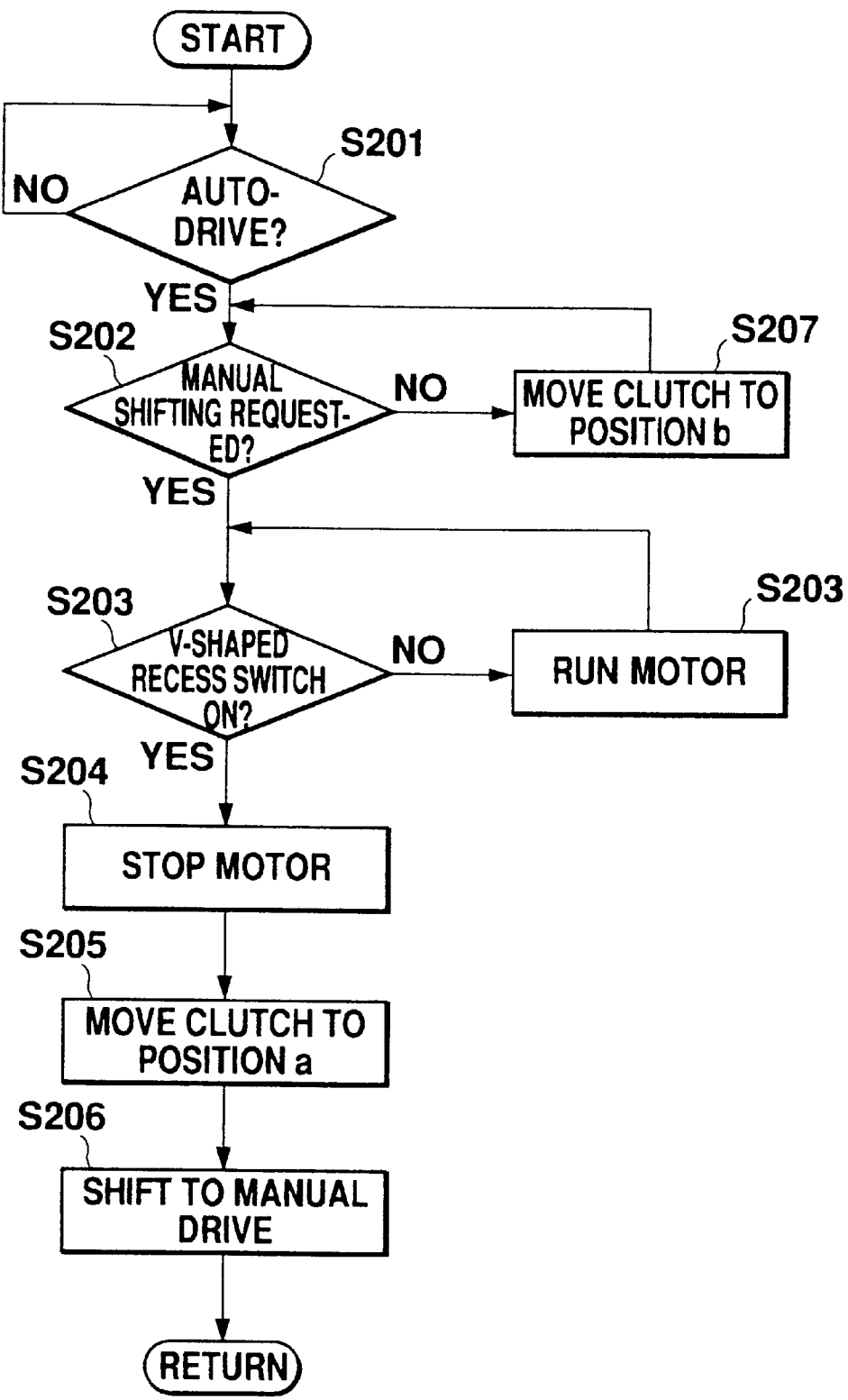
FIG. 4 is a flowchart showing another operation of the first embodiment.

FIG. 4 shows a processing flowchart for automatically synchronizing the steering angles. In the same way as the process shown in FIG. 3, it is first judged whether or not the vehicle is in auto-drive (S201). When it is judged that the vehicle is in auto-drive, it is next judged whether or not the driver has input a demand for shifting to the manual drive (S202). When the driver does not operate the manual shifting switch and desires to continue automatic steering, the actuator 24 moves the disk 16 (or the clutch) to the position b to separate the projections 17 of the disk 16 from the grooves 15 of the disk 14 and connects the steering wheel 10 and the steering shaft 12 by the ball 20 (S207). As described above, if torque equal to or exceeding a prescribed value is applied in this state, the ball 20 is separated from the V-shaped recess 18 and the turning torque of the steering shaft 12 is not transmitted to the steering wheel 10. When the driver demands shifting from auto-drive to the manual drive, it is judged whether or not the switch within the V-shaped recess 18 has been turned ON (S203). And, when the V-shaped recess switch 26 has not been turned ON, the process is different from the one shown in FIG. 3, and a motor mounted on the steering wheel 10 is run to align the position of the V-shaped recess 18 with that of the ball 20 (S208). When the ball 20 enters the V-shaped recess 18, the V-shaped recess switch 26 is turned ON as described above, and the motor which has detected the ON signal stops running (S204), then the actuator 24 moves the disk 16 (or the clutch) to the position a to shift to the manual drive (S205, S206). Thus, since the driver simply operates the manual shifting switch to perform the steering angle synchronization automatically, the operating load on the driver can be reduced.

When the ball 20 is entered into the V-shaped recess 18 by running the motor, it is preferable that the motor is stopped and a message of the completion of the steering angle synchronization is given to the driver. Thus, the driver can make sure that a shift to the manual drive can be made.

Second embodiment:

In the first embodiment described above, the disks 14, 16 had respective grooves 15 and projections 17 to form the clutch. But, the disk 14 and the disk 16 can be formed flat without any projection or groove and the ball 20 can be pushed firmly into the V-shaped recess 18 to connect the steering wheel 10 and the steering shaft 12. Such a structure is shown in FIGS. 5A, 5B.

Figure 5A:
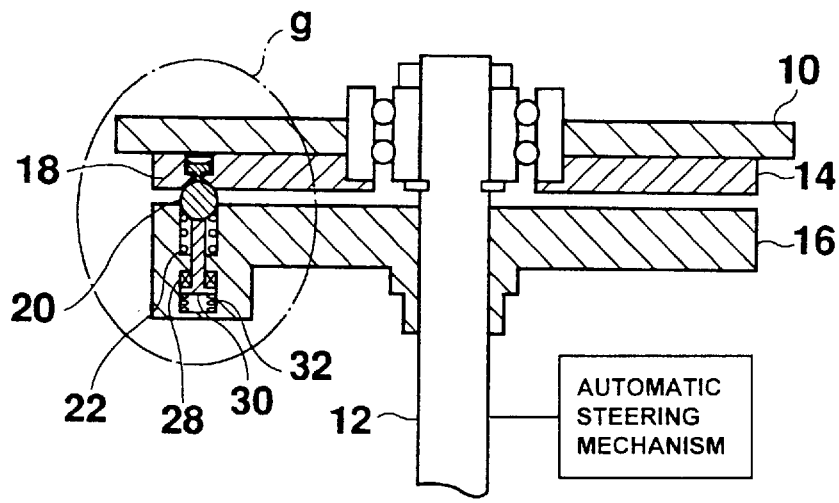
FIG. 5A is a sectional view of a second embodiment of the invention.

In FIG. 5A, the disk 14 and the disk 16 are flat and do not have grooves 15 or projections 17 which are shown in FIGS. 1A, 1B. Torque control means denoted by g in FIG. 5A include an electromagnetic coil 28, a plunger 30 and a spring 32 which are provided as a clutch in the disk 16, in addition to the V-shaped recess 18, the ball 20 and the spring 22.

Figure 5B:
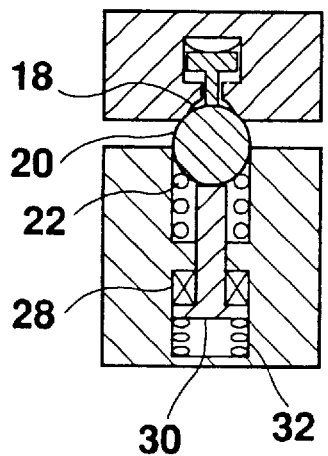
FIG. 5B is a partially expanded sectional view of FIG. 5A.

FIG. 5B is an expanded view of the torque control means g shown in FIG. 5A. In the same way as in FIGS. 1A, 1B, the ball 20 is pushed by the spring 22 toward the V-shaped recess 18. In addition, the plunger 30 is provided below the ball 20 and pushed by the spring 32 toward the ball 20. The electromagnetic coil 28 is provided around the plunger 30, and the plunger 30 can be pushed downward despite an elastic force of the spring 32 by flowing a current through the electromagnetic coil 28. In a state that no current is run through the electromagnetic coil 28, the plunger 30 is pushed upward by the elastic force of the spring 32, and the ball 20 is firmly pushed against the V-shaped recess 18. The pushing force of the plunger 30 against the ball 20 serves as a force for connecting the steering wheel 10 and the steering shaft 12, so that the steering wheel 10 and the steering shaft 12 are turned together during manual drive.

During automatic steering, on the other hand, a current is sent through the electromagnetic coil 28, and the plunger 30 is pushed downward against the elastic force of the spring 32. Thus, the ball 20 is positioned in the V-shaped recess 18 by the elastic force alone of the spring 20 in the same way as in the first embodiment, and separated from the V-shaped recess 18 when torque equal to or exceeding a prescribed value is applied to the steering wheel 10, thereby allowing the steering wheel 10 to turn freely.

Figure 6:
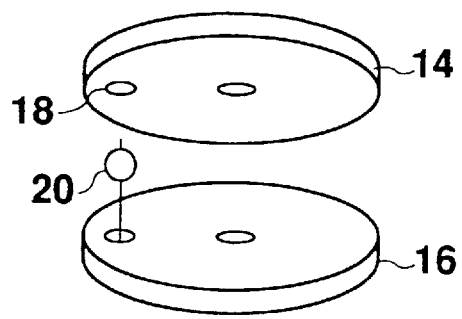
FIG. 6 is a layout explanatory view of the disks and ball shown in FIG. 5A.

FIG. 6 shows shapes of the disk 14 and the disk 16 in schematic form. By comparing with the shapes in the first embodiment shown in FIG. 2, it is apparent that these disks 14, 16 are different from those shown in FIG. 2. Specifically, these disks 14, 16 do not have the grooves 15 and the projections 17 which are shown in FIG. 2 but have V-shaped recess 18 and a ball 20 provided at mutually opposed positions. Also, the ball 20 is firmly pushed by an elastic force toward the V-shaped recess 18 to couple the disk 14 and the disk 16. Thus, the ball 20 functions as a clutch, and the steering wheel 10 can be freely turned when torque equal to or exceeding a prescribed value is applied during automatic steering. It is to be understood that to shift from automatic steering to manual steering in this embodiment, the driver must request alignment of the V-shaped recess 18 with the ball 20 or the steering wheel 10 is turned by the motor to synchronize the steering angles.

In the above embodiments, the V-shaped recess 18 and the ball 20 were provided in the quantity of one respectively but can be provided in multiple numbers as required, and may be provided at positions to oppose at an angle of 180 degrees.

In the above embodiments, when torque equal to or exceeding a prescribed value is applied to the steering wheel 10, the engagement of the V-shaped recess 18 and the ball 20 was released to allow the steering wheel 10 to turn freely. But, when the vehicle is provided with another sensor and an emergency situation of the vehicle is detected by this sensor, the steering operation by the driver during the automatic steering is judged to cope with the emergency situation. In such a case, the ball 20 is fixed in the V-shaped recess 18 to firmly couple the steering wheel 10 with the steering shaft 12, the automatic steering control is released, and the driver can then operate the steering wheel 10 with priority. To fix the ball 20 within the V-shaped recess 18, for example, the current flow through the electromagnetic coil 28 may be stopped to firmly push the ball 20 into the V-shaped recess 18 by the plunger 30 in FIGS. 5A, 5B.

Also, in the above embodiments, the V-shaped recess was provided on the side of the steering wheel and the ball on the side of the steering shaft, but the ball can be provided on the side of the steering wheel and the V-shaped recess on the side of the steering shaft. However, since the ball and the mechanism for pushing the ball are relatively complicated, the ball is preferably provided on the steering shaft.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. An automatic steering apparatus for a vehicle comprising:

(a) turning means for automatically turning a steering shaft, and (b) torque control means for connecting a manual steering wheel to the steering shaft during operation of the turning means in an automatic mode, the torque control means interrupting transmission of torque from the steering wheel to the steering shaft when torque equal to or exceeding a prescribed value other than said automatic turning torque is applied to the steering wheel during automatic turning.

2. An automatic steering apparatus for a vehicle comprising:

(a) turning means for automatically turning a steering shaft, and (b) torque control means for interrupting the transmission of automatic turning torque to a steering wheel when torque equal to or exceeding a prescribed value other than said automatic turning torque is applied to the steering wheel during automatic turning, wherein said torque control means comprise:

a ball disposed for rotation with one of the steering shaft and the steering wheel and an elastic member for pushing said ball toward the other of the steering shaft and the steering wheel, and a recess provided on said other of the steering shaft and the steering wheel to fit to said ball;

said ball being fitted into said recess to transmit said automatic turning torque from said steering shaft to said steering wheel, and said ball being separated from said recess when torque equal to or exceeding a prescribed value other than said automatic turning torque is applied to said steering wheel.

3. The automatic steering apparatus according to claim 2, further comprising:

a first disk on a leading end of said steering shaft, and a second disk on the back of said steering wheel and opposing said first disk;

said first disk having projections and said second disk having grooves opposing said projections, and said projections and said grooves being mutually engaged for manual steering to integrally turn said first disk and said second disk, and said projections being separated from said grooves for automatic steering.

4. The automatic steering apparatus according to claim 2, further comprising:

electromagnetic drive means connected to said ball to push it against said recess;

said electromagnetic drive means being inoperative so that said ball is pushed solely by said elastic member during automatic steering, and said electromagnetic drive means being operative to push said ball against said recess during manual steering.

5. An automatic steering apparatus for a vehicle comprising:

an automatic steering mechanism for turning a steering shaft, a clutch connecting said steering shaft with a steering wheel during manual turning and releasing said steering shaft from said steering wheel during automatic steering, and a sub-clutch connecting said steering shaft with said steering wheel by a given elastic force during automatic steering.

6. The automatic steering apparatus according to claim 5, wherein said sub-clutch comprises:

a spring associated with said steering shaft, a ball connected to said spring and pushed toward said steering wheel, and a recess associated with said steering wheel for receiving said ball.

7. The automatic steering apparatus according to claim 3, wherein said projections and said grooves are mutually engaged after fitting said ball into said recess, thereby to transmit steering torque to the steering shaft during manual steering.

* * * * *